(12) United States Patent
Thakur et al.

(10) Patent No.: US 8,335,875 B1
(45) Date of Patent: Dec. 18, 2012

(54) SYSTEM AND METHOD FOR PERFORMING ISOCHRONOUS DATA BUFFERING

(75) Inventors: Anshuman Thakur, Beaverton, OR (US); Abdul R. Ismail, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/168,400

(22) Filed: Jun. 24, 2011

(51) Int. Cl.
*G06F 3/00* (2006.01)
*G06F 5/00* (2006.01)
*G06F 15/16* (2006.01)

(52) U.S. Cl. .............. 710/60; 710/56; 709/233

(58) Field of Classification Search ............. 710/56, 710/60; 709/233
See application file for complete search history.

(56) References Cited

U.S. PATENT DOCUMENTS

| | | | |
|---|---|---|---|
| 3,623,020 A * | 11/1971 | Mao ............................ 710/60 |
| 6,396,891 B1 * | 5/2002 | Masafumi et al. .......... 375/376 |
| 6,766,387 B2 * | 7/2004 | Sano ............................ 710/52 |
| 7,213,096 B2 | 5/2007 | Keys |
| 7,526,590 B2 | 4/2009 | Ismail |
| 7,701,973 B2 | 4/2010 | Colman |
| 8,065,441 B2 | 11/2011 | Panesar |
| 2002/0034273 A1 * | 3/2002 | Spence et al. ............. 375/354 |
| 2002/0049872 A1 * | 4/2002 | Kamihara et al. ........... 710/71 |
| 2002/0141410 A1 * | 10/2002 | Beshenar et al. .......... 370/392 |
| 2003/0217185 A1 | 11/2003 | Thakur |
| 2007/0050819 A1 * | 3/2007 | Yamanashi ................. 725/58 |
| 2009/0245446 A1 * | 10/2009 | Hsieh et al. ................ 375/362 |
| 2011/0125975 A1 * | 5/2011 | Kim et al. .................. 711/157 |
| 2012/0078690 A1 | 3/2012 | Harriman |

* cited by examiner

*Primary Examiner* — Chun-Kuan Lee
*Assistant Examiner* — Farley Abad
(74) *Attorney, Agent, or Firm* — Ked & Associates LLP

(57) ABSTRACT

A controller for a host system includes an interface and a buffer. The interface receives a plurality of data units isochronously received from a connected device, and the buffer stores the data units and then output a data block upon the occurrence of at least one condition. Each data unit stores data of a first size and the data block includes data of a second size greater than the first size. The connected device may be a Universal Serial Bus (USB) device or another type of device.

19 Claims, 4 Drawing Sheets

SYSTEM AND METHOD FOR PERFORMING ISOCHRONOUS DATA BUFFERING

FIELD

One or more embodiments described herein relate to data flow control.

BACKGROUND

Power management continues to be a goal of system designers. One principle source of power consumption involves processing the transfer of data from a connected device based on the transfer rate of the device. This causes the system processor and/or memory receiving the data to operate on a frequent (or near-constant) basis. As a result, excessive power is consumed which reduces efficiency and depletes battery power.

DETAILED DESCRIPTION

Figure 1:
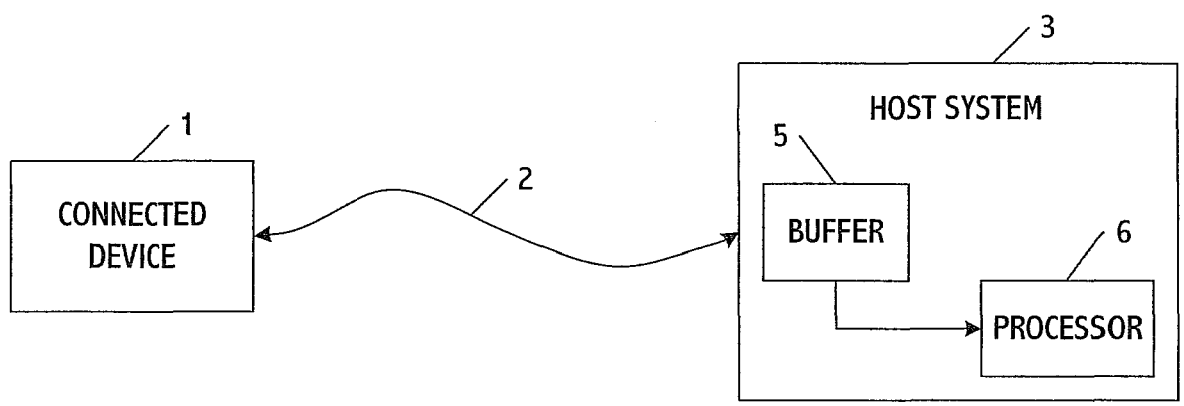
FIG. 1 shows one embodiment of a data buffering system.

FIG. 1 shows one embodiment of a data buffering system which includes a device 1 connected to a host system 3 through an interface 2. The connected device may be any one of a variety of peripheral or data-transfer devices. According to one embodiment, the connected device is an isochronous device, which, for example, may be one which transfers data at regular intervals or specific/discrete periods of time. Isochronous devices include but are not limited to music and audio devices, media players, digital cameras, and web cams. In other embodiments, the connected device may be one that is not isochronous. Examples include a compact disk-recordable (CD-R) or other forms of data and external disk drives, mice and other types of input devices, printers, keyboards and flash memory devices as well as others.

The interface 2 may be a wired or wireless link. If wireless, the interface may be a Bluetooth or wireless fidelity (WiFi) links. If wired, the interface may be one compatible with a version of the Universal Serial Bus (USB) standard (e.g., USB 2.0 or 3.0), the Firewire standard, or a Wide or other Local Area Network or wired Ethernet. Of course, different wired or wireless links may be used in other embodiments.

The host system 3 may be a notebook or desktop computer, a handheld computing device such as a personal digital assistant or iPod/iPhone, a smart phone, or any other device that has, for example, a Firewire or USB connection for receiving data.

As shown in FIG. 1, the host system includes a buffer 5 and a processor 6. The buffer has a capacity sufficient to store a predetermined amount of data received from the connected device. The predetermined amount of data may correspond, for example, to an amount of data the device can transfer over a predetermined period of time, which is to exceed the flow rate of the device. The data stored in the buffer is transferred to the processor and/or an associated memory upon the occurrence of one or more conditions.

In terms of data transfer from the buffer, in accordance with one embodiment the buffer may be flushed isochronously based on, for example, an isochronous flush threshold that is much higher than the threshold in the device. Doing so exploits a disconnect between the isochronous expectation from system SW (mostly with higher threshold due to software evolving faster) versus input/output (I/O) devices, which may provide isochronous transfers at lower granularity to bring power savings in the platform.

In view of the foregoing, the buffer may therefore be labeled an ISO buffer to indicate a particular application for buffering data transferred on an isochronous (ISO) basis. The buffer 5 may be a different type of buffer in other embodiments.

In some instances, because of its capacity, the buffer may serve to create a time delay between when the data is received from the connected device and when the data is received by the system processor and/or associated memory. This may happen because of system software that requires the handling of data at bigger time chunks. However, when the system software is paired (or more compatible) with devices based on standards such as USB 2.0 (where data gets transferred more frequently), one embodiment of the invention may bridge this gap in time to prevent a delay from occurring.

During this time delay, the buffer serves to control the amount of data transferred to the processor and/or memory, e.g., because of the buffer, greater amounts of data are transferred at a time to the processor and memory than would be transferred in a flow-through application in which data is transferred to the processor and memory at the flow rate of the device.

Although the time the data reaches the CPU is delayed by the buffering operation, the buffer may not cause any decrease in overall data transfer time because of the larger-sized data transfers taking place. In fact, the transfer of larger amounts of data may actually result in improved efficiency and speed of the transfer process.

As a result, power is only selectively used and on a less frequent basis to control the data transfer to the processor and memory, and at a rate much less than would be required if power were used to control the processor and memory at a data transfer rate which corresponds to the connected device and/or interface. Put differently, as a result of the buffer, power is applied to the processor and/or memory independently from a data rate of the connected device and/or the interface used to transfer the data to the host system.

Figure 2:
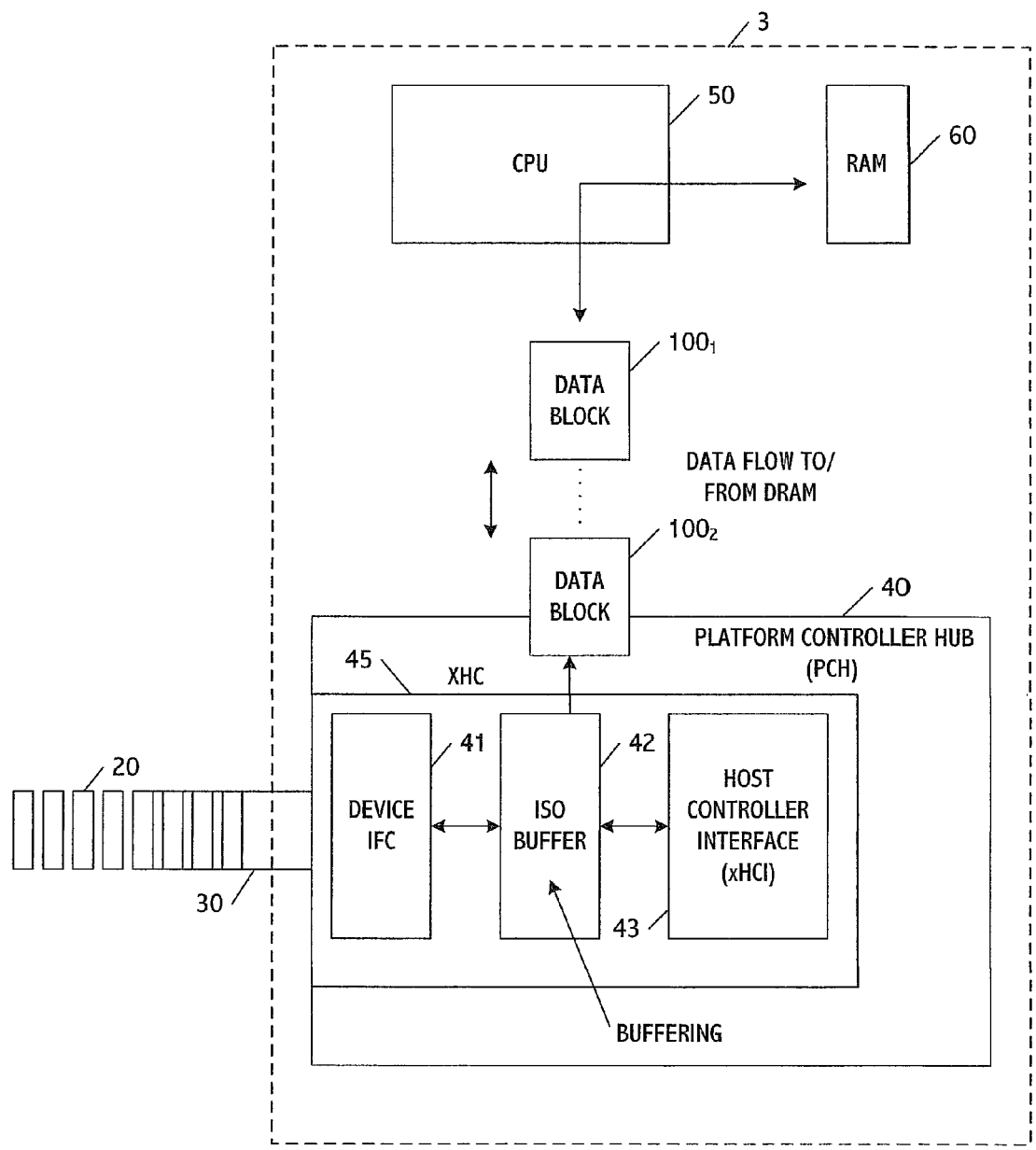
FIG. 2 shows an example of a host system for isochronous USB data buffering.

FIG. 2 shows an example of a host system 3 for receiving data from a connected device over a USB or USB-compatible interface. This system includes a USB connector 30, a platform controller hub (PCH) 40, a central processing unit (CPU) 50, and a random access memory (RAM) or other type of memory 60. The connector 30 may be, for example, one adapted to receive data according to a USB 2.0 or USB 3.0 standard. The data flow from the connected device is shown as discrete packets 20, each packet including a predetermined amount of data.

The platform controller hub 40 includes a USB host controller (xHC) 45 that includes a device interface (IFC) 41, a buffer 42, and a host controller interface (xHCI) 43. The device interface receives data transmitted over a USB cable at the data rate of this device. This rate may be, for example, one data or control packet every 128 microseconds (μsec) or 1 millisecond (ms). The packets may hold the same amount of data and/or may have the same maximum data holding capacity. The USB cable may have connectors at both ends that conform to a USB standard, or just one of the connectors may conform to a USB standard and the other connector being different for coupling to a corresponding one of the device or host system.

The device interface 41 transfers the data isochronously received through the USB connector to the ISO buffer 42. As indicated, the buffer has a storage capacity that exceeds the maximum data capacity of each packet. According to one example, if the data transfer rate of each packet is 1 ms, the buffer may have a storage capacity sufficient to store 16 ms of data. In other embodiments, the buffer may have a smaller or larger capacity and/or the data transfer rate of the connected device may have a smaller or larger data rate.

Also, in accordance with one embodiment, the data through the interface may be received in data packets or data units, each having a data payload portion of a predetermined size. The payload data may be stored in the buffer. At the time of output, the stored data may be reformatted into a frame or otherwise formatted into a single group to be transmitted as a unit to other parts of the host system.

The buffer will be controlled, by the host controller interface 43, to output its data to the CPU 50 based on the occurrence of one or more predetermined conditions. According to one embodiment, a first condition is the buffer storing a predetermined amount of data from the packets transferred through the interface 41. The predetermined amount of data may be less than the data storage capacity of the buffer.

A second condition is the host controller interface receiving an interrupt or request signal from the CPU, indicating that the data should be transferred. In this latter condition, the amount of data in the buffer may transferred even though the buffer is not filled to capacity. In another embodiment, a combination of these or other conditions may be used as the basis for initiating data transfers from the buffer.

In FIG. 2, the host controller interface 43 is shown transferring multiple blocks 100 of data from the buffer. One of the blocks $100_1$ of data may be output when the first condition occurs, e.g., when the buffer reaches a maximum or predetermined capacity as determined, for example, by a capacity detector. In the example previously discussed, data block $100_1$ may transfer an amount of packet data that the USB cable carried during 16 ms of time. The data blocks may be transferred as one group of data or one data unit. The data may be transferred serially as one group or in parallel. When the data received from the connected device is in packets, the stored data payload portion of the packets are stored in the buffer and may then be reformatted as a frame or other type of single data group for processing.

Another one of the blocks $100_2$ of data may be output when an interrupt or request signal is received from the CPU. This may occur, for example, an application run by the CPU requests data, for example, in response to a user-initiated function or request. In this case, data block $100_2$ may have the same capacity as block $100_1$ or less. The interrupt or request signal may be received by the host controller interface, which then will initiate the data transfer of block $100_2$ in response. The data blocks output from the buffer may be sent directly to the RAM 60, directly to the CPU for processing, or to the RAM through the CPU.

By buffering data and then transferring large sized blocks to the CPU and/or memory, data transfer operations are performed less frequently. This translates into a reduction in power consumption and potentially longer operation in battery mode. The size of the data blocks may be different from a payload size of data packets that correspond to a USB standard. For example, the size of the data block may be greater than any USB or other interface standard that corresponds to the connected device.

This transfer of large-sized buffered blocks may improve device and/or host system efficiency because it may reduce the use of the processor and/or frees the processor to perform other functions within the system.

Figure 3:
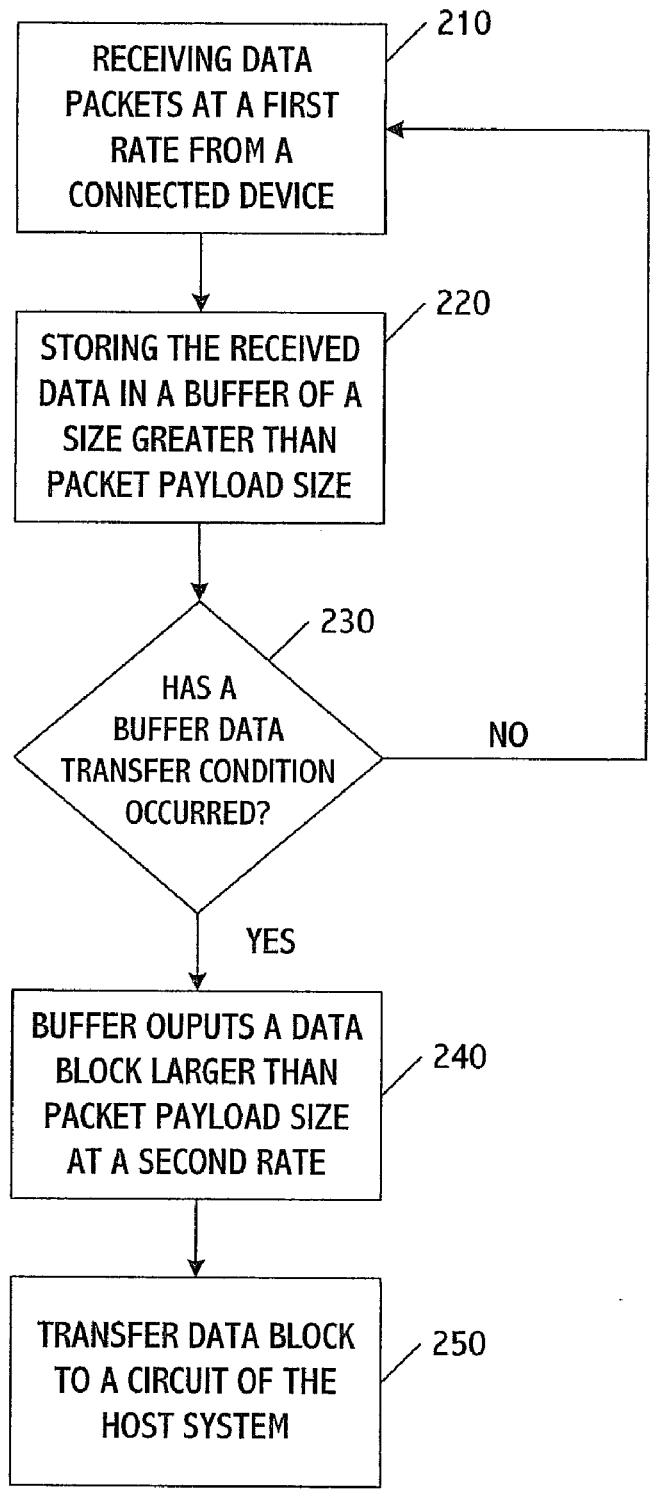
FIG. 3 shows an embodiment of a method for isochronous USB data buffering.

FIG. 3 shows one embodiment of a method for controlling transfer of data from a connected device to a processor and/or memory of a host system. This method may be performed by the systems of FIG. 1 or 2 and therefore the connected device is not necessarily a USB device.

In an initial operation, data is received by a host system at a first rate from a connected device. (Block 210). The data may be received in packets having a predetermined data-carrying (payload) capacity, and the packets may be received by the host system over a wired or wireless link. As previously indicated, in the case of a USB data transfer, the first rate may be one data packet every 1 ms or every 128 μs, depending on, for example, the USB standard used.

In another operation, the data in the received packets are stored in a buffer having a size greater than the payload size of each data packet transferred from the connected device. (Block 220). The data may continue to be stored in the buffer until one or more predetermined conditions occur.

Thus, in a next operation, a check is performed to determine whether a condition has occurred for transferring data from the buffer. (Block 230). The check may be performed, for example, by the host controller interface or another circuit element. If the check indicates that no condition has occurred, data packets may continue to be stored in the buffer until a condition occurs.

As indicated, a first condition may correspond to the buffer storing a predetermined amount of data from the packets transferred through the interface 41. The predetermined amount of data may be less than the data storage capacity of the buffer or less than this capacity.

A second condition is the host controller interface receiving an interrupt or request signal from the CPU, indicating that the data should be transferred. The amount of data in the buffer may transferred even through the buffer is not filled to capacity. In another embodiment, a combination of these or other conditions may be used as the basis for initiating data transfers from the buffer.

If a condition has occurred, the host controller interface may control the buffer to output a data block of a predetermined size larger than the payload capacity of each received data packet. (Block 240). Because of the larger size of the data block, the data from the buffer may be output at a burst transmission different from a burst transmission from the connected device. In accordance with one embodiment, the burst transmission from the buffer may be faster than the burst transmission from the connected device. The output data may be transferred to a host system CPU, memory, or both, or to even another circuit in the host system. (Block 250).

Figure 4:
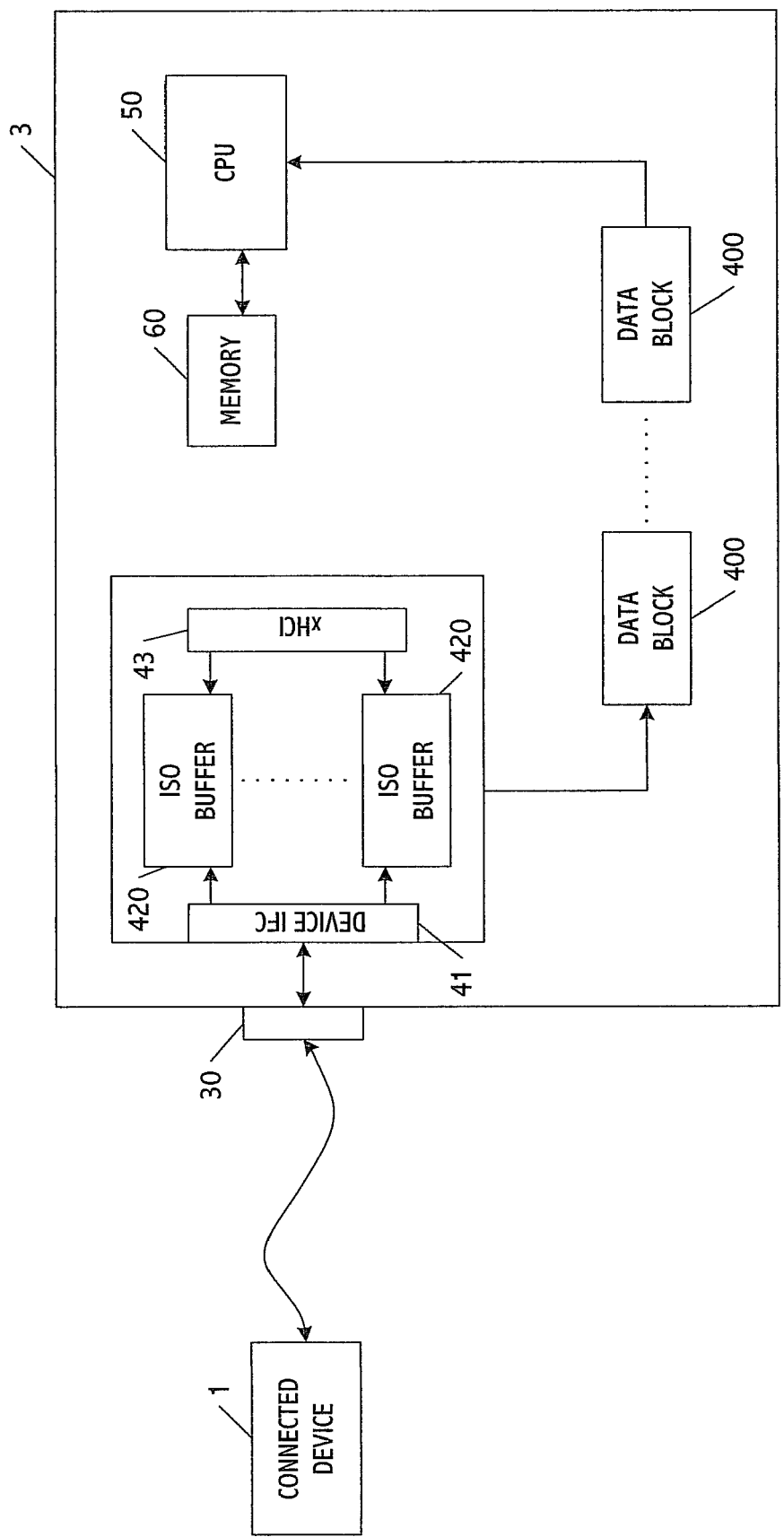
FIG. 4 shows another example of a host system for isochronous USB data buffering.

FIG. 4 shows another embodiment of a host system equipped with multiple ISO buffers 420. In this system, the payload portion of received data packets may be stored in the buffers until one of the aforementioned conditions occur. When such a condition occurs, data blocks 400 may be output from the buffers for processing by the CPU 50 and/or storage in memory 60. The data block transfer operations may be managed by the host controller interface or another circuit and/or software program.

The ISO buffers may all have a same storage capacity (e.g., each buffer may store received data over a 10 ms period) or their capacities may be different. When one buffer is filled, another or succeeding buffer may be filled with received data until a data block transfer condition occurs. Additionally, or alternatively, each data buffer may be used to store a different kind of data. In this case, data from the blocks may be selectively output based on the occurrence of different conditions. Even in the case where all of the buffers store data irrespective of data type, the data in the blocks may be selectively output based on the occurrence of different conditions, as managed by the host controller interface.

In the event that the host system includes multiple data (e.g., USB) connectors, different one or an array of ISO data buffers may be assigned to store the data transferred through each connector. Also, instead of storing an amount of data over a period of time (e.g., isochronous flow period of time is equal to or based on amount of data), the buffers according to any of the embodiments described herein may instead store the data in a predeteimined number of packets.

For example, consider the case where audio data is received by the host system. The host controller or device driver circuits may include multiple ISO buffers to store the audio data packets. For example, such a situation may occur for different endpoints that each bring or otherwise provide data. In this case, each buffer may store data received over 10 ms time periods or may store the data in 10 received data packets. The buffer may output this data (upon the occurrence of a condition, for example, as indicated above) to the host memory. The use of these buffers may reduce the number of wakes from a CPU low-power state by as much as 90% in some applications.

In accordance with any of the aforementioned embodiments, an ISO buffer may be used to store data in a reverse data path. For example, in the embodiment of FIG. 2, data output from CPU 50 and/or memory 60 may be stored in ISO buffer 42 over a predetermined period of time, or from a predetermined number of packets. According to one example, if the data from the CPU or memory are not in packet form, the data may be divided into discrete blocks or segments prior to buffering. When a condition occurs (e.g., buffer full status or interrupt or request signal), the data may be transferred out of the buffer and sent to the connected device.

This case may apply, for example, when the buffered data are audio data packets from a host system media player or inserted disc and the connected device is a set of USB headphones or earbuds, when the buffered data are audio packets from a voice-over-Internet Protocol (VoIP) call or video chat or video conferencing application. The buffered data may be output to the connected device in a data frame of a predetermined size. For example, where each block stores 10 ms of data, the data output from the buffer may be divided into 10 one millisecond blocks, incorporated into respective data packets, and then sent to the device over the USB interface. Transfer of data to the connected device may take place every 1 ms, every 128 µs, or according to another type of USB or other interface standard.

In accordance with another embodiment, a computer-readable medium stores a program for controlling transfer of data from a connected device to a host system. The connected device and host system may be any of the devices or systems previously mentioned. The program may be stored in a system memory which, for example, may be internal or external to the CPU or host controller interface. In one embodiment, the program may be part of a control algorithm for controlling the operation of the host controller interface.

The program may include code to perform any of the operations or functions performed in the embodiments previously discussed herein. According to one non-limiting example, the program may include first code to control storing a plurality of data units in a buffer and second code to transfer a block of data from the buffer upon the occurrence of at least one condition. The data units may be isochronously received through a Universal Serial Bus (USB) or other type of interface, and each data unit may include data of a first size and the data block may include data of a second size greater than the first size. The second size of the data block corresponds to data stored in a predetermined number of data units received through the USB interface or to an amount of data received through the USB interface over a predetermined period of time.

In this disclosure, a data unit may correspond to all or a portion of a data packet and the data carried by that unit may correspond to the payload portion of that packet. Alternatively, a data unit may correspond to a predetermined amount of data that may be carried or processes in non-packet form.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with the features of one or more other embodiments to form new embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus comprising:
   an interface; and
   a first buffer to store a plurality of data units isochronously received at a first rate through the interface, and to output a data block at a second rate upon the occurrence of at least one condition, wherein:
   the first rate is different from the second rate,
   the first rate is a data output rate of a mobile device coupled to the interface,
   two or more data units are to include data of substantially a first size and the data block is to include data of a second size greater than the first size, and
   the interface is a Universal Serial Bus (USB)-compatible interface,
   wherein the apparatus further comprises a second buffer to store data units isochronously transferred through the interface and wherein:
   the first buffer is to store a first kind of data,
   the second buffer is to store a second kind of data, a first data block is to be output based on data units stored in the first buffer at the second rate based on a first condition, and a second data block is to be output based on data units stored in the second buffer at the second rate based on a second condition different from the first condition.

2. The apparatus of claim 1, wherein the first data size corresponds to a payload size of packet data corresponding to a predetermined USB standard and the second data size of the data block does not correspond to a payload size corresponding to the predetermined USB standard.

3. The apparatus of claim 1, wherein the first buffer is to output the first data block when an amount of data stored in the buffer equals a predetermined amount.

4. The apparatus of claim 1, wherein the first buffer is to output the first data block in response to an interrupt signal.

5. The apparatus of claim 1, wherein the first buffer is to output the first data block in response to a request signal to be generated from an application running on a host system.

6. The apparatus of claim 1, wherein the second size of the data block corresponds to data stored in a predetermined number of data units.

7. The apparatus of claim 1, wherein the second size of the data block corresponds to an amount of data to be received through the USB-compatible interface over a predetermined period of time.

8. The apparatus of claim 1, wherein the first buffer is to store additional data to be received from a processor of a host system, the additional buffered data to be output through the USB-compatible interface to a connected device.

9. The apparatus of claim 1, wherein the first and second buffers are to have a same data storage capacity.

10. The apparatus of claim 1, wherein power is applied to the buffer to output the data block at the second rate independently from the first rate corresponding to the data output rate of the mobile device.

11. A method comprising:
receiving a plurality of data units isochronously at a first rate through an interface, the first rate corresponding to a data output rate of a mobile device coupled to the interface;
storing the data units in a buffer; and
transferring a block of data from the buffer at a second rate upon the occurrence of at least one condition, wherein the second rate is different from the first rate, wherein two or more data unit include data of substantially a first size and the data block includes data of a second size greater than the first size, and wherein the interface is a Universal Serial Bus (USB)-compatible interface,
wherein the method further comprises storing data units in a second buffer isochronously transferred through the interface and wherein:
the first buffer is to store a first kind of data,
the second buffer is to store a second kind of data,
a first data block is to be output based on data units stored in the first buffer at the second rate based on a first condition, and a second data block is to be output based on data units stored in the second buffer at the second rate based on a second condition different from the first condition.

12. The method of claim 11, wherein the first data size corresponds to a payload size of packet data corresponding to a predetermined USB standard and the second data size of the data block does not correspond to a payload size of the predetermined USB standard.

13. The method of claim 11, wherein the first or second condition is when an amount of data stored in a respective one of the first or second buffer equals at least a predetermined amount.

14. The method of claim 13, wherein the first or second least one condition is when an interrupt or data request signal is received.

15. The method of claim 11, wherein the second size of the data block corresponds to data stored in a predetermined number of data units.

16. The method of claim 11, wherein the second size of the data block corresponds to an amount of data received through the USB-compatible interface over a predetermined period of time.

17. A non-transitory computer-readable medium storing a program for controlling transfer of data, the program comprising:
first code to control storing a plurality of data units in a buffer received at a first rate corresponding to a data output rate of a mobile device; and
second code to transfer a block of data from the buffer at a second rate upon the occurrence of at least one condition, wherein:
the second rate is different from the first rate,
the data units are to be isochronously received through a Universal Serial Bus (USB)-compatible interface,
two or more data units include data of a first size, and
the data block includes data of a second size greater than the first size, and
wherein program further comprises code to store data units in a second buffer isochronously transferred through the interface and wherein:
the first buffer is to store a first kind of data,
the second buffer is to store a second kind of data,
a first data block is to be output based on data units stored in the first buffer at the second rate based on a first condition, and a second data block is to be output based on data units stored in the second buffer at the second rate based on a second condition different from the first condition.

18. The computer-readable medium of claim 17, wherein the second size of the data block corresponds to data stored in a predetermined number of data units received through the USB-compatible interface.

19. The computer-readable medium of claim 17, wherein the second size of the data block corresponds to an amount of data received through the USB-compatible interface over a predetermined period of time.

* * * * *